(12) United States Patent
Kuang et al.

(10) Patent No.: US 7,853,011 B2
(45) Date of Patent: Dec. 14, 2010

(54) METHODS AND APPARATUS FOR MONITORING THE INTEGRITY OF A QUANTUM CHANNEL SUPPORTING MULTI-QUANTA PULSE TRANSMISSION

(75) Inventors: Randy Kuang, Kanata (CA); Guo Qiang Wang, Kanata (CA)

(73) Assignee: Ciena Corporation, Linthicum, MD (US)

( * ) Notice: Subject to any disclaimer, the term of this patent is extended or adjusted under 35 U.S.C. 154(b) by 1417 days.

(21) Appl. No.: 11/235,134

(22) Filed: Sep. 27, 2005

(65) Prior Publication Data

US 2006/0256966 A1 Nov. 16, 2006

Related U.S. Application Data

(60) Provisional application No. 60/680,477, filed on May 13, 2005.

(51) Int. Cl.
*H04L 9/00* (2006.01)
*H04K 1/00* (2006.01)
*H04L 9/28* (2006.01)

(52) U.S. Cl. ..................... 380/28; 380/255; 380/287
(58) Field of Classification Search .................. 380/28, 380/255, 287
See application file for complete search history.

(56) References Cited

U.S. PATENT DOCUMENTS

| 5,675,648 | A | 10/1997 | Townsend |
| 5,732,139 | A | 3/1998 | Lo et al. |
| 5,764,765 | A | 6/1998 | Phoenix et al. |
| 5,768,378 | A | 6/1998 | Townsend et al. |
| 5,953,421 | A | 9/1999 | Townsend |
| 6,188,768 | B1 | 2/2001 | Bethune et al. |
| 6,438,234 | B1 * | 8/2002 | Gisin et al. .................. 380/256 |
| 6,473,719 | B1 * | 10/2002 | Steenblik .................. 702/181 |
| 6,678,379 | B1 | 1/2004 | Mayers et al. |
| 6,801,626 | B1 * | 10/2004 | Nambu ........................ 380/256 |
| 7,233,672 | B2 | 6/2007 | Mitchell et al. |

(Continued)

OTHER PUBLICATIONS

Quantum Cryptography Tutorial, http://www.cs.dartmouth.edu/~jford/crypto.html, May 16, 2005, 5 pages.

(Continued)

*Primary Examiner*—William R Korzuch
*Assistant Examiner*—Trang Doan
(74) *Attorney, Agent, or Firm*—Kent Daniels; Blake, Cassels & Graydon LLP

(57) ABSTRACT

A transmitter classifies quantum pulses into supervisory pulses and message pulses, and assigns each message pulse to a message bit. Each message pulse is then encoded using a coding base randomly selected from a set of coding bases, and with a polarity relative to the coding base that depends on the value of the corresponding message bit. Supervisory pulses are encoded using a coding base different from the coding bases in the aforementioned set. The encoded pulses are sent to a recipient over a quantum channel. The transmitter also informs the recipient of the positions of the supervisory pulses. The recipient detects the pulses relative to a locally selected coding base, producing a zero-click, a one-click or a two-click. By measuring the received proportion of zero-clicks, one-clicks and two-clicks, for both message pulses and supervisory pulses, and by verifying whether these detection statistics obey certain expected relationships, the recipient can determine whether an attack is taking place on the quantum channel.

9 Claims, 8 Drawing Sheets

U.S. PATENT DOCUMENTS

| | | | |
|---|---|---|---|
| 7,403,623 B2 | 7/2008 | Cerf et al. | |
| 7,457,416 B1 * | 11/2008 | Elliott | 380/256 |
| 7,515,716 B1 * | 4/2009 | Elliott | 380/256 |
| 7,570,767 B2 | 8/2009 | Lo | |
| 7,580,524 B2 * | 8/2009 | Gisin et al. | 380/256 |
| 7,627,126 B1 * | 12/2009 | Pikalo et al. | 380/279 |
| 2001/0055389 A1 * | 12/2001 | Hughes et al. | 380/44 |
| 2002/0097874 A1 | 7/2002 | Foden et al. | |
| 2003/0169880 A1 * | 9/2003 | Nambu et al. | 380/256 |
| 2004/0161109 A1 | 8/2004 | Trifonov | |
| 2004/0184603 A1 | 9/2004 | Pearson et al. | |
| 2004/0190725 A1 | 9/2004 | Yuan et al. | |
| 2005/0135620 A1 * | 6/2005 | Kastella et al. | 380/256 |
| 2005/0135627 A1 | 6/2005 | Zavriyev et al. | |
| 2005/0190922 A1 | 9/2005 | LaGasse | |
| 2005/0286723 A1 | 12/2005 | Vig et al. | |
| 2006/0222180 A1 | 10/2006 | Elliott | |
| 2006/0239463 A1 | 10/2006 | Young | |
| 2006/0256966 A1 | 11/2006 | Kuang et al. | |
| 2008/0037998 A1 | 2/2008 | Zhengfu et al. | |
| 2008/0144833 A1 | 6/2008 | Matsumoto | |

OTHER PUBLICATIONS

BB84 Demo, http://monet.mercersburg.edu/henle/bb84/demo.php, May 16, 2005, 3 pages.

PCT/CA2006/000644 (ISR), Aug. 11, 2006, Nortel Networks.

PCT/CA2006/000645 (ISR), Aug. 21, 2006, Nortel Networks.

PCT/CA2006/000646 (ISR), Aug. 21, 2006, Nortel Networks.

PCT/CA2006/000647 (ISR), Aug. 21, 2006, Nortel Networks.

Arda, A Quantum Information Science and Technology Roadmap, Jul. 19, 2004, 17 pages, Version 1.0, United States of Amercia, http://qist.lanl.gov.

Id Quantique SA, Understanding Quantum Cryptography, Apr. 2005, 12 pages, Version 1.0, Switzerland.

Karen Kelly, Quantum decoys foil code-breaking attempts, Jul. 18, 2005, 3 pages, Univeristy of Toronto, Canada, http://www.news.utoronto.ca/bin6/050718-1521.asp.

Office Action mailed on Aug. 27, 2009 in connection with U.S. Appl. No. 11/481,906.

Office Action mailed on Sep. 24, 2009 in connection with U.S. Appl. No. 11/298,673.

Office Action mailed on Oct. 29, 2009 in connection with U.S. Appl. No. 11/481,826.

* cited by examiner

METHODS AND APPARATUS FOR MONITORING THE INTEGRITY OF A QUANTUM CHANNEL SUPPORTING MULTI-QUANTA PULSE TRANSMISSION

CROSS-REFERENCE TO RELATED APPLICATION

The present invention claims the benefit under 35 USC §119(e) of prior U.S. provisional patent application Ser. No. 60/680,477 to Kuang et al., filed on May 13, 2005, incorporated by reference herein.

FIELD OF THE INVENTION

The present invention relates generally to communication over quantum channels and, more particularly, to methods and apparatus for monitoring the integrity of a quantum channel that supports transmissions utilizing multi-quanta pulses such as multi-photon pulses.

BACKGROUND

A quantum channel is a channel for carrying quanta such as photons or electrons from a transmitter to a recipient. A specific example of a quantum channel is an optical fiber. In order to generate quanta for transmission over a quantum channel, a Poisson source is typically used. The Poisson source is characterized by the emission of a variable number of quanta per interval of time (or "pulse"), where the probability distribution of the number of quanta per pulse over a large number of pulses resembles that of a Poisson random variable. Through external regulation of the Poisson source, it is possible to control the mean number of quanta per pulse (denoted $\lambda$).

Quantum cryptography is a field of technology devoted to the study of methodologies that exploit certain enhanced security possibilities afforded by the quantum nature of the aforementioned quantum channel. One such methodology is the BB84 protocol, described in C. H. Bennett and G. Brassard, "Quantum Cryptography: Public Key Distribution and Coin Tossing", *Proceedings of IEEE International Conference on Computers Systems and Signal Processing*, Bangalore, India, December 1984, pp. 175-179, hereby incorporated by reference herein. Assuming the validity of certain assumptions, the BB84 protocol allows communicating parties (referred to in the literature as "Alice" and "Bob") to detect when photons have been intercepted or otherwise tampered with by an intermediate party (referred to in the literature as "Eve").

One of the assumptions required for effectiveness of the BB84 protocol and other existing quantum cryptographic methodologies is that there be virtually zero probability of finding two or more photons in a single pulse. To achieve this condition using the aforementioned Poisson source, the value of $\lambda$ (i.e., the mean number of photons per pulse) needs to be significantly reduced, often to a point where only every tenth or hundredth pulse, on average, contains photons (and hence can carry information). Thus, even with back-to-back pulses of a duration as short as several nanoseconds (ns), one will appreciate that the data rate on the quantum channel can drop to a few hundred bits per second or less, depending on prevailing conditions (e.g., loss, dispersion, detection efficiency, etc.).

In view of the above, it is clear that in order to guarantee the effectiveness of conventional quantum cryptographic methodologies, the data rate of the quantum channel will be artificially constrained to a low value. It is thus not surprising that the applications which most commonly use conventional quantum cryptographic methodologies involve securely transmitting very small amounts of secret information. For example, this can include the distribution of a secret or private key, which is then used to encrypt (over a classical channel) larger amounts of information requiring secure transmission.

While it would be desirable to achieve higher data rates over the quantum channel, one cannot merely increase the value of $\lambda$ at the Poisson source without sacrificing the security benefits of conventional quantum cryptographic methodologies. This is because even though increasing $\lambda$ will cause a greater percentage of pulses to contain photons (and hence can carry information), a significant number of these pulses will contain more than one photon. This violates the aforementioned condition for effective use of conventional quantum cryptographic methodologies, which requires that there be virtually zero probability of finding a pulse that contains more than a single photon. The net effect of this violation is that during those pulses that contain multiple photons, eavesdropping attacks on the quantum channel may go undetected by conventional quantum cryptographic methodologies.

Thus, it would be advantageous to increase the bandwidth of the quantum channel while continuing to be in a position to detect eavesdropping activities that may occur on the quantum channel. This would enable not only a greater speed of secret/private key distribution, but also would enable generalized higher-bandwidth exchanges to take place in a secure manner.

SUMMARY OF THE INVENTION

A first broad aspect of the present invention seeks to provide an apparatus for monitoring the integrity of a quantum channel capable of carrying quanta from a transmitter, with the quanta appearing in a plurality of pulses received at the apparatus. The apparatus comprises a detection module adapted for producing a plurality of detection outcomes, each of the detection outcomes being indicative of a quantum characteristic detected in a respective one of the received pulses. The apparatus also comprises a controller connected to the detection module. The controller is adapted for receiving information allowing each of the received pulses to be identified as either a message pulse or a supervisory pulse and generating an indication of the integrity of the quantum channel at least partly on a basis of the detection outcomes produced for the supervisory pulses.

A second broad aspect of the present invention seeks to provide a method for monitoring the integrity of a quantum channel capable of carrying quanta from a transmitter, with the quanta appearing in a plurality of received pulses. The method comprises producing a plurality of detection outcomes, each of the detection outcomes being indicative of a quantum characteristic detected in a respective one of the received pulses. The method also comprises receiving information allowing each of the received pulses to be identified as either a message pulse or a supervisory pulse. Finally, the method comprises generating an indication of the integrity of the quantum channel at least partly on a basis of the detection outcomes produced for the supervisory pulses.

A third broad aspect of the present invention seeks to provide an apparatus for monitoring the integrity of a quantum channel capable of carrying quanta from a transmitter, with the quanta appearing in a plurality of received pulses. The apparatus comprises means for producing a plurality of detection outcomes, each of the detection outcomes being indicative of a quantum characteristic detected in a respective one of the received pulses. The apparatus also comprises means for receiving information allowing each of the received pulses to be identified as either a message pulse or a supervisory pulse. Finally, the apparatus comprises means for generating an indication of the integrity of the quantum channel at least partly on a basis of the detection outcomes produced for the supervisory pulses.

A fourth broad aspect of the present invention seeks to provide an apparatus for transmitting a plurality of message data elements to a recipient over a quantum channel. The apparatus comprises a source adapted for emitting pulses of quanta, the number of quanta per pulse being variable over time. The apparatus also comprises a controller adapted for (1) designating certain ones of the pulses as supervisory pulses and other ones of the pulses as message pulses; (2) associating each of the message data elements with a respective one of the message pulses; and (3) informing the recipient as to which pulses are message pulses and which pulses are supervisory pulses. The apparatus further comprises a quantum characteristic imparting module adapted for: (1) for each pulse containing one or more quanta, imparting to the one or more quanta a quantum characteristic. When the pulse is a message pulse, the quantum characteristic is defined by a base dynamically selected from a plurality of message coding bases and a polarity relative to the base, the polarity being selected in accordance with a data value of the message data element associated with said pulse. When the pulse is a supervisory pulse, the quantum characteristic is defined by a base selected from at least one supervisory coding base, each of the at least one supervisory coding base being distinct from each of the plurality of message coding bases. Finally, the quanta are released into the quantum channel.

A fifth broad aspect of the present invention seeks to provide a method for transmitting a plurality of message data elements over a quantum channel. The method comprises emitting pulses of quanta, the number of quanta per pulse being variable over time; designating certain ones of the pulses as supervisory pulses and other ones of the pulses as message pulses; and associating each of the message data elements with a respective one of the message pulses. Further, for each pulse containing one or more quanta, the method imparting to the one or more quanta a quantum characteristic. When the pulse is a message pulse, the quantum characteristic is defined by a base dynamically selected from a plurality of message coding bases and a polarity relative to the base, the polarity being selected in accordance with a data value of the message data element associated with said pulse. When the pulse is a supervisory pulse, the quantum characteristic is defined by a base selected from at least one supervisory coding base, each of the at least one supervisory coding base being distinct from each of the plurality of message coding bases. Finally, the method comprises releasing the quanta into the quantum channel and informing a recipient as to which pulses are message pulses and which pulses are supervisory pulses.

A sixth broad aspect of the present invention seeks to provide an apparatus for transmitting a plurality of message data elements over a quantum channel. The apparatus comprises means for emitting pulses of quanta, the number of quanta per pulse being variable over time; means for designating certain ones of the pulses as supervisory pulses and other ones of the pulses as message pulses; and means for associating each of the message data elements with a respective one of the message pulses. Further, for each pulse containing one or more quanta, the apparatus imparts to the one or more quanta a quantum characteristic. When the pulse is a message pulse, the quantum characteristic is defined by a base dynamically selected from a plurality of message coding bases and a polarity relative to the base, the polarity being selected in accordance with a data value of the message data element associated with said pulse. When the pulse is a supervisory pulse, the quantum characteristic is defined by a base selected from at least one supervisory coding base, each of the at least one supervisory coding base being distinct from each of the plurality of message coding bases. Finally, the apparatus comprises means for releasing the quanta into the quantum channel and means for informing a recipient as to which pulses are message pulses and which pulses are supervisory pulses.

A seventh broad aspect of the present invention seeks to provide a method of monitoring the integrity of a quantum channel. The method comprises receiving detection outcomes from a detection module, the received detection outcomes resulting from an attempt by the detection module to detect a quantum characteristic of each of a sequence of pulses received via the quantum channel, each of the received detection outcomes belonging to a set of possible detection outcomes. The method also comprises receiving information allowing each of the received pulses to be identified as a first type pulse or a second type pulse. The method further comprises determining a probability distribution of the possible detection outcomes among the received detection outcomes for the first type pulses, thereby to generate a plurality of first outcome statistics; as well as determining a probability distribution of the possible detection outcomes among the received detection outcomes for the second type pulses, thereby to generate a plurality of second outcome statistics. Finally, the method comprises monitoring the first and second outcome statistics and, responsive to one or more of the outcome statistics undergoing a change, outputting an alarm signal indicative of a loss of integrity of the quantum channel.

An eighth broad aspect of the present invention seeks to provide a computer-readable storage medium containing a program element for execution by a computing device to implement a method of monitoring the integrity of a quantum channel. The program element includes program code means for receiving detection outcomes from a detection module, the received detection outcomes resulting from an attempt by the detection module to detect a quantum characteristic of each of a sequence of pulses received via the quantum channel, each of the received detection outcomes belonging to a set of possible detection outcomes. The program element further includes program code means for receiving information allowing each of the received pulses to be identified as a first type pulse or a second type pulse. The program element further includes program code means for determining a probability distribution of the possible detection outcomes among the received detection outcomes for the first type pulses, thereby to generate a plurality of first outcome statistics. The program element further includes program code means for determining a probability distribution of the possible detection outcomes among the received detection outcomes for the second type pulses, thereby to generate a plurality of second outcome statistics. Finally, the program element also includes program code means for monitoring the first and second outcome statistics and program code means for outputting an alarm signal indicative of a loss of integrity of the quantum channel in response to one or more of the outcome statistics undergoing a change.

BRIEF DESCRIPTION OF THE DRAWINGS

These and other aspects and features of the present invention will now become apparent to those of ordinary skill in the art upon review of the following description of specific embodiments of the invention in conjunction with the accompanying drawings.

In the accompanying drawings.

It is to be expressly understood that the description and drawings are only for the purpose of illustration of certain embodiments of the invention and are an aid for understanding. They are not intended to be a definition of the limits of the invention.

DETAILED DESCRIPTION OF EMBODIMENTS

Figure 1:
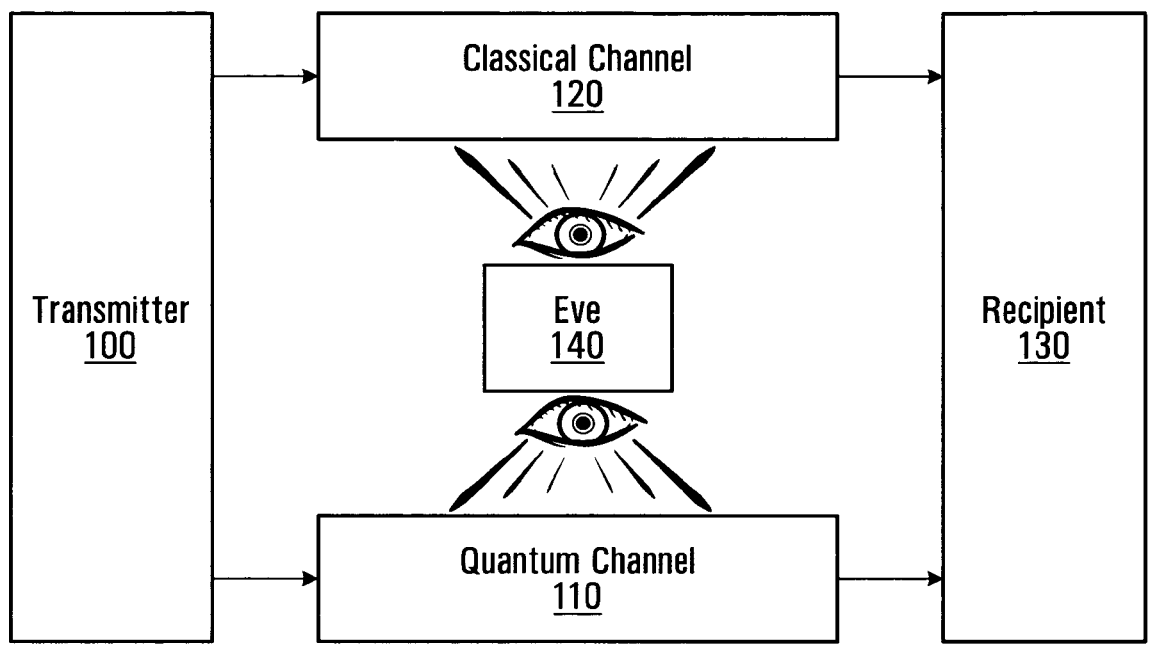
FIG. 1 is a block diagram showing a transmitter in communication with a recipient over a quantum channel, in accordance with a non-limiting example embodiment of the present invention.

With reference to FIG. 1, there is shown a transmitter 100 in communication with a recipient 130 over a quantum channel 110. The quantum channel 110 can be defined as a communication channel that is capable of transporting quanta from the transmitter 100 to the recipient 130. Quanta can be defined as an indivisible entity, which in two non-limiting embodiments includes quanta of light (e.g., photons) or other electromagnetic radiation, as well as electrical quanta (e.g., electrons). In a specific non-limiting example where the quanta are photons, the quantum channel 110 may be embodied as an optical waveguide such as an optical fiber. In another specific non-limiting example, the quantum channel 110 may be embodied as a wireless or free-space optical (FSO) link.

Optionally, the transmitter 100 may also be in communication with the recipient 130 over a classical channel 120. For its part, the classical channel 120 may be embodied as a conventional wired, wireless or optical link, or a collection of such links, which possibly traverses one or more networks.

Potentially located between the transmitter 100 and the recipient 130 is an intermediate party, referred to as Eve 140, which may attempt to "eavesdrop" on the transmissions taking place over the quantum channel 110. It should be noted that Eve 140 may also attempt to eavesdrop on the transmissions taking place over the classical channel 120; however, this aspect of Eve's activities is not dealt with here.

Transmitter 100

Figure 2:
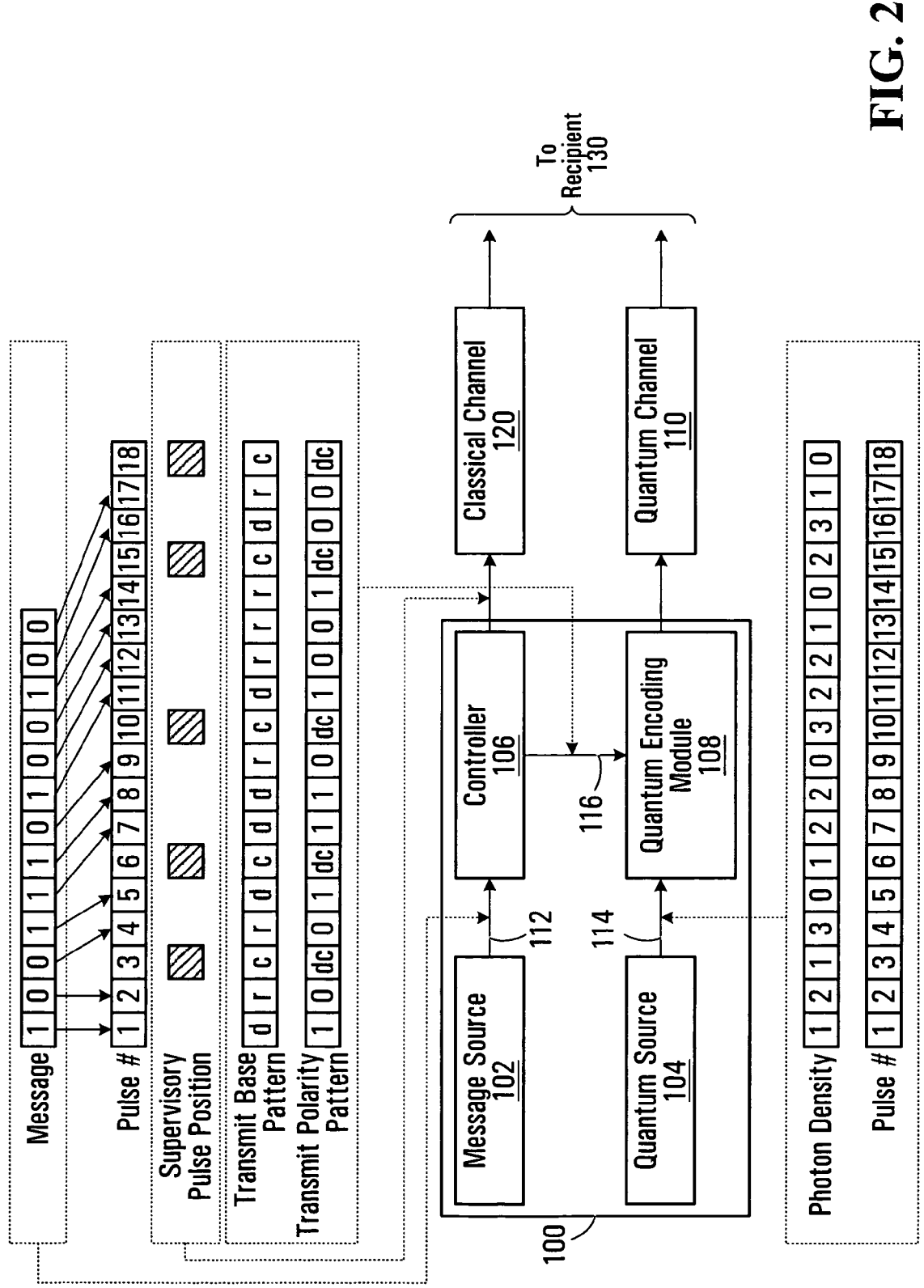
FIG. 2 depicts the transmitter of FIG. 1 in greater detail, along with an example scenario comprising several example pulses including message pulses and supervisory pulses.

With reference now to FIG. 2, there is shown in greater detail the transmitter 100, comprising a message source 102, a quantum source 104, a controller 106 and a quantum encoding module 108. The message source 102 generates a message destined for the recipient 130. Two non-limiting example embodiments of the message source 102 include a communication device and a computing apparatus. The message source 102 provides the message to the controller 106 along a data link 112. The message carried on the data link 112 may be in the form of message bits or symbols or, more generally, message data elements having respective data values.

In the example embodiment illustrated in FIG. 2, the message carried over the data link 112 comprises the message bits "1001110100100". However, this is merely an example of a message that the transmitter 100 may wish to send to the recipient 130, and is not to be considered limitative in any respect whatsoever.

The quantum source 104 outputs quanta to the quantum encoding module 108 along a communication link 114. In an example, the quanta may be photons, the quantum source 104 may be a photon gun and the communication link 114 may be an optical waveguide such as an optical fiber. The output of the quantum source 104 may be viewed as a sequence of pulses, with the number of photons in each pulse being a random variable whose characteristics are set by the properties of the quantum source 104.

In a non-limiting example, the quantum source 104 may be a Poisson source as is known in the art. A Poisson source is characterized by the emission of a variable number of photons per interval of time (or "pulse"), where the probability distribution of the photon density (i.e., the number of photons per pulse) over a large number of pulses is (or approximates) a Poisson random variable. In other words, the probability that the number of photons in a given pulse will be n is given by—or approaches—$(\lambda^n/n!)e^{-\lambda}$, where the parameter $\lambda$ denotes the mean photon density.

Figure 3A:
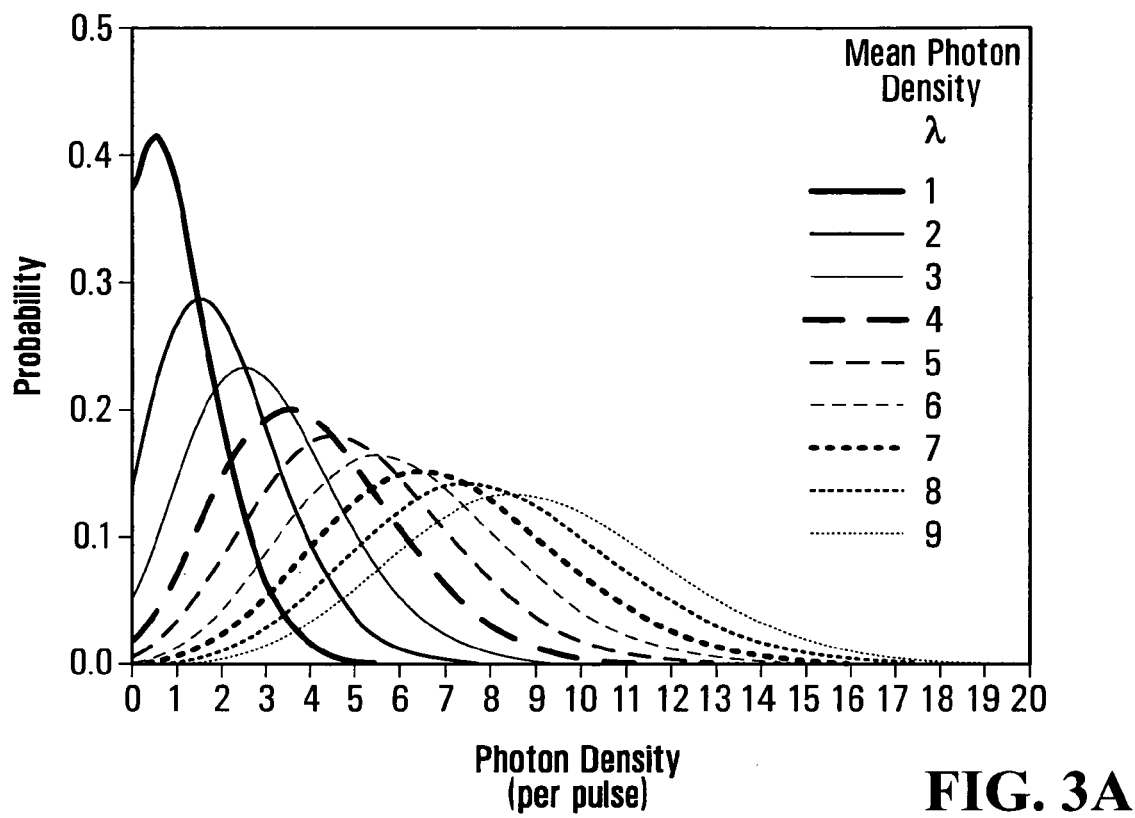
FIG. 3A is illustrative of the Poisson distribution.

For the reader's benefit, FIG. 3A shows a plot of the Poisson distribution for different values of $\lambda$. It is noted that in accordance with the Poisson distribution, there is always a non-zero probability that a pulse will not contain any photons. Such a pulse is hereinafter referred to as a vacuum pulse.

Figure 3B:
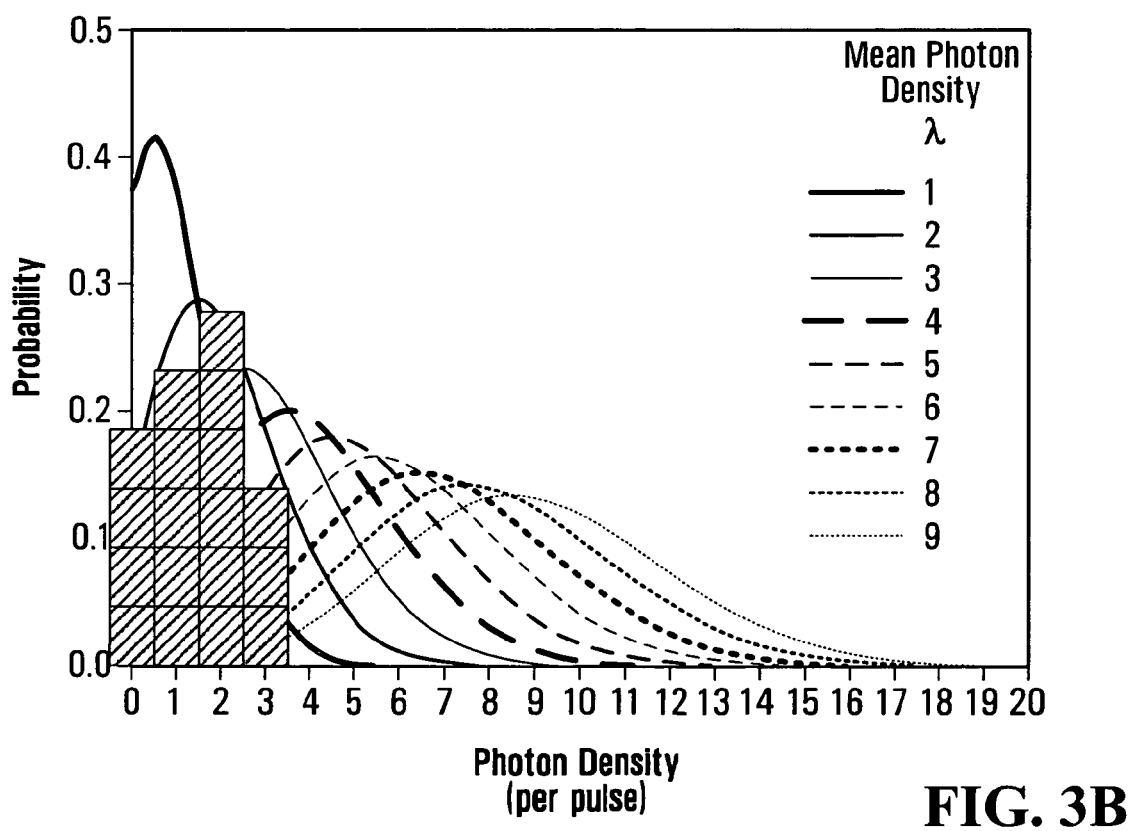
FIG. 3B shows a histogram of the photon density of the aforementioned example pulses, overlaid onto the Poisson distribution of FIG. 3A.

In the example embodiment illustrated in FIG. 2, eighteen (18) example pulses on the communication link 114 are represented in the lower part of the drawing by boxes numbered 1 through 18. Each of the pulses also has an associated photon density, i.e., a number of photons in that pulse. If one were to draw a histogram of the photon density, as shown in FIG. 3B, one would see that it approximately resembles the Poisson distribution for $\lambda=2$. Of course, it should be understood that the number of pulses and the photon density have been selected artificially, for illustrative purposes only and are not to be considered limitative in any respect whatsoever.

The quantum encoding module 108 is now described. From a functional point of view, the quantum encoding module 108 is a device that imparts a quantum characteristic to the quanta (if any) in each pulse. In two specific non-limiting embodiments, the quantum encoding module 108 may be a polarization modulator or a phase modulator.

In the illustrated non-limiting embodiment, the quantum encoding module 108 is a polarization modulator. Thus, for each pulse received from the quantum source 104 along the communication link 114, the quantum encoding module 108 imparts a polarization orientation to the photons (if any) in that pulse. The polarization orientation for each pulse is set by the controller 106 and is identified to the quantum encoding module 108 via a control link 116. After imparting the appropriate polarization orientation to the photons in a given pulse, the quantum encoding module 108 releases the polarized photons onto the quantum channel 110 towards the recipient 130.

The polarization orientation imparted by the quantum encoding module 108 to the photons in a given pulse is characterized by two components, the first being known as an elementary polarization "base", and the second being known as a polarization "polarity" relative to the elementary polarization base. The following table shows the polarization orientation resulting from different selections of the polarization base ("rectilinear", "diagonal", "circular") and the polarization polarity ("0" or "1"). Still other bases and orientations will be known to those of skill in the art.

TABLE 1

| Polarization base | Polarization polarity | Polarization orientation |
|---|---|---|
| Rectilinear | "1" | Vertical |
| | "0" | Horizontal |
| Diagonal | "1" | 135-degree |
| | "0" | 45-degree |
| Circular | "1" | Left |
| | "0" | Right |

The controller 106 is now described. The controller 106 receives the message bits from the message source 102 along the data link 112. In addition, the controller 106 has knowledge or control of the boundaries between the pulses being emitted by the quantum source 104. In accordance with an embodiment of the present invention, the controller 106 designates certain pulses as "supervisory" pulses and the rest as "message" (i.e., non-supervisory) pulses. The percentage of total pulses that are supervisory pulses is immaterial; in a specific non-limiting example embodiment, it may be on the order of 10%.

Additionally, the controller 106 associates each of the message bits with a corresponding one of the message pulses. Thus, the message pulses are used to convey the message bits to the recipient 130.

In the specific non-limiting example embodiment illustrated in FIG. 2, and referring specifically to the top portion of the drawing, the pulses in positions 3, 6, 10, 15 and 18 have been designated as supervisory pulses, while the pulses in positions 1, 2, 4, 5, 7-9, 11-14, 16 and 17 have been designated as message pulses. The message pulses are respectively associated with the message bits "1001110100100". Of course, it should be understood that the number of supervisory pulses and their relative positions have been selected for illustrative purposes only and are not to be considered limitative in any respect.

Additionally, the controller 106 determines the polarization orientation to be imparted to each pulse by the quantum encoding module 108. Specifically, the controller 106 determines the polarization base and the polarization polarity for each pulse. This information is sent to the quantum encoding module 108 via the aforementioned control link 116. In accordance with an embodiment of the present invention, and as will now be described in greater detail, the polarization base and the polarization polarity for a given pulse depend on whether that pulse is a supervisory pulse or a message pulse.

For a message pulse, the controller 106 instructs the quantum encoding module 108 to use a polarization base selected from a predetermined set of two or more "message coding bases". The selection of which polarization base to use for a given pulse is made in a random or unpredictable manner, or at least in a manner that is unknown to the recipient 130. As for the polarization polarity, this is set by the controller 106 to reflect the value of the message bit associated with the pulse in question. In a specific non-limiting embodiment, it is envisaged that a "0" message bit can be associated with a "0" polarization polarity and a "1" message bit can be associated with a "1" polarization polarity. However, the opposite is also a possibility within the scope of the present invention.

For a supervisory pulse, the controller 106 instructs the quantum encoding module 108 to use a "supervisory coding base", of which there may be just one. The supervisory coding base (or each supervisory coding base, if more than one is used) is chosen to be different from any of the message coding bases. It is also advantageous that the supervisory coding base be known only to the transmitter 100. Thus, if the rectilinear and diagonal bases are used for the message pulses, a suitable supervisory coding base could be the circular base or any other base unknown to the recipient 130. As for the polarization polarity, it is inconsequential. Thus, it is perfectly acceptable for the photon content in all supervisory pulses to be polarized with the circular polarization base and with a polarization polarity that alternates between "right" and "left" in a random or unpredictable fashion from one supervisory pulse to the next.

In the specific non-limiting example embodiment illustrated in FIG. 2, the polarization bases for the message pulses in positions 1, 2, 4, 5, 7-9, 11-14, 16 and 17 are "drrdddrdrrrdr", where "d" stands for diagonal and "r" stands for rectilinear. It can also be seen that the polarization base for the supervisory pulses in positions 3, 6, 10, 15 and 18 is the circular polarization base (denoted "c"). Thus, the overall "transmit base pattern" for the eighteen (18) pulses is "drcrdcddrcdrrrcdrc". Of course, it should be understood that the two message coding bases (namely, "d" and "r") and the supervisory coding base (namely, "c") have been selected for illustrative purposes only and are not to be considered limitative in any respect.

Continuing with the specific non-limiting example embodiment illustrated in FIG. 2, the polarization polarities for the message pulses in positions 1, 2, 4, 5, 7-9, 11-14, 16 and 17 are "1001110100100", which is basically a replica of the message bits. It can also be seen that the polarization polarity for the supervisory pulses in positions 3, 6, 10, 15 and 18 is "dc", which stands for "don't care". In other words, either of the two polarization polarities (namely "0" or "1") could be used for each of the supervisory pulses. Thus, the overall "transmit polarity pattern" for the eighteen (18) pulses is "1,0,dc,0,1,dc,1,1,0,dc,1,0,0,1,dc,0,0,dc".

The transmit base pattern and the transmit polarity pattern are provided by the controller 106 to the quantum encoding module 108 via the control link 116. In operation, for each successive pulse received from the quantum source 104 along the communication link 114, the quantum encoding module 108 determines the associated polarization base and polarization polarity and imparts the resultant polarization orientation to the photon content in that pulse. For further information regarding the polarization orientation resultant from a given polarization base and polarization polarity, the reader is referred to Table 1, above. The polarized photons are released onto the quantum channel 110 with the intent of having them reach the recipient 130.

In addition to the above, the controller 106 informs the recipient 130 of the relative positions of the supervisory pulses. This can be achieved using conventional methods, e.g., by use of the classical channel 120 or another channel.

Quantum Channel 110

The quantum channel 110 may be afflicted by efficiency problems due to loss (attenuation), dispersion and the like. However, in order not to cloud the reader's understanding of the present invention, it will be assumed for the time being that quantum channel 110 is a loss-less, dispersion-less communication channel for transporting photons. In the absence of Eve 140, such a channel will permit all transported photons to preserve the polarization orientation that was imparted to them by the transmitter 100 as they travel from the transmitter 100 to the recipient 130.

However, things change when Eve 140 is present and tries to attack the quantum channel 110. The nature of a possible attack typically falls into one of two basic categories, specifically, an "intercept-and-resend" attack (or IRA) and a "beam split attack" (or BSA). In the case of an IRA, Eve 140 intercepts the photons in a given pulse, detects them and replaces the intercepted photons with new photons. In the case of a BSA, Eve 140 selects one or more photons in a given pulse, detects them but does not replace them; rather, the photon-depleted pulses continue along the quantum channel 110.

As will be described in greater detail herein below, the aforementioned categories of attacks become detectable, even over multi-photon pulses, when the teachings of the present invention are implemented.

Recipient 130

Figure 4A:
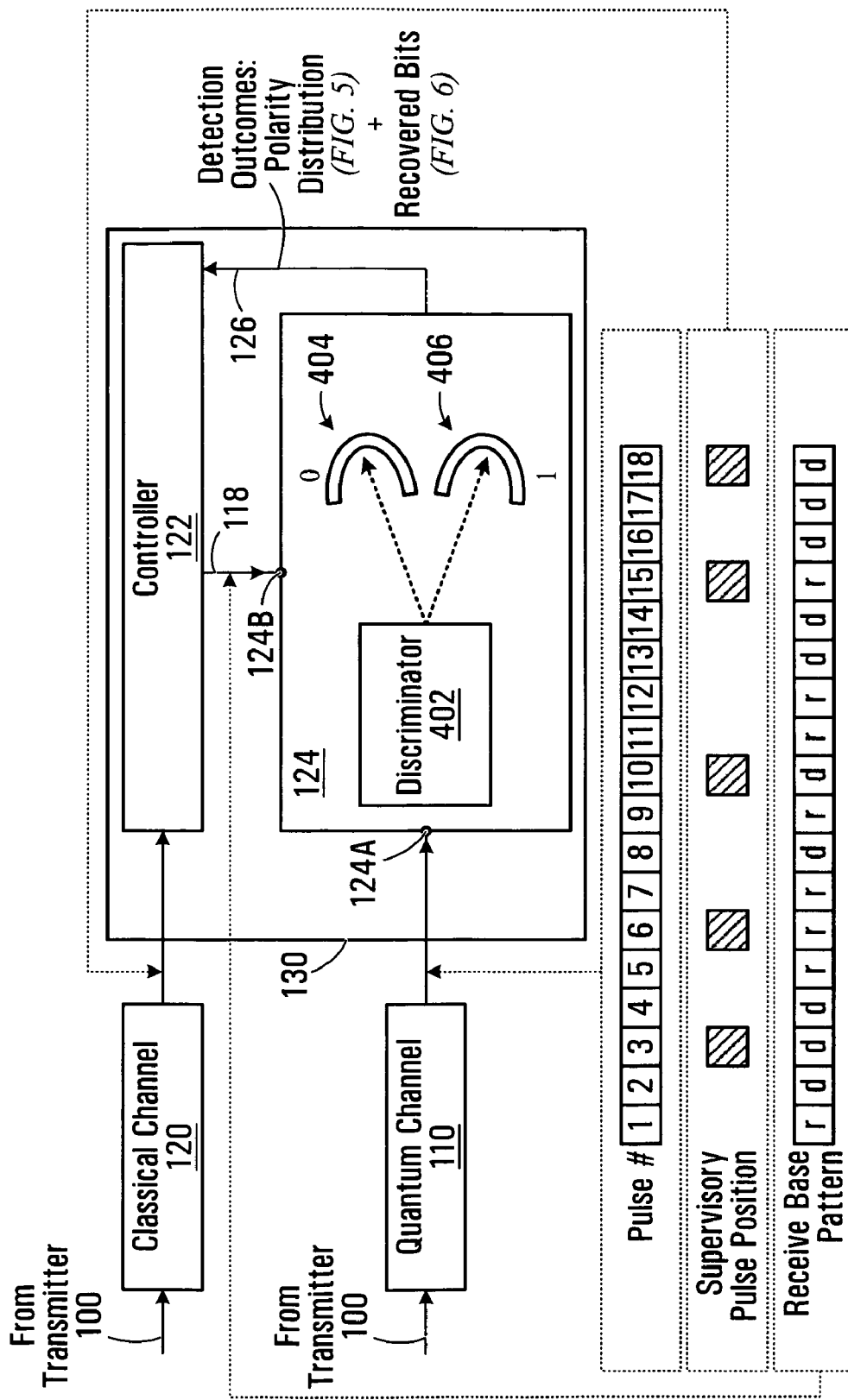
FIG. 4A depicts, at the recipient of FIG. 1, a detection module and a controller in greater detail, along with the aforementioned example pulses.

With reference to FIG. 4A, there is shown a block diagram of the functional components of the recipient 130, including a controller 122 and a detection module 124. The detection module 124 is coupled to the quantum channel 110, over which it is expected that quanta (in this case, photons) will be received from the transmitter 100.

The controller 122 is operable to generate a "receive base pattern", which is supplied to the detection module 124 via a data link 118. The receive base pattern comprises a sequence of coding bases randomly or unpredictably selected from among the aforementioned "message coding bases" used by the transmitter 100. In the specific non-limiting embodiment being described here, the receive base pattern comprises a sequence of polarization bases randomly selected from between the rectilinear base and the diagonal base. However, this selection is not to be considered limiting in any respect whatsoever.

It is also noted that the receive base pattern is generated without the recipient 130 having obtained knowledge of the transmit base pattern used by the transmitter 100. Thus, for some of the received pulses, a given base in the receive base pattern will match the corresponding base in the transmit base pattern (this is known as a "polarization base match"), while for others it will not (this is known as a "polarization base mismatch").

To take the example embodiment illustrated in FIG. 4A, it is noted that the receive base pattern is "rdddrrrdrdrrddrddd". Recalling that the transmit base pattern was "drcrdcd-drcdrrrcdrc", one notices that a polarization base match only exists for received pulses 8, 9, 12 and 16. Of course, it should be understood that the receive base pattern used in this example is merely illustrative in nature and is not to be considered limitative in any respect whatsoever.

The detection module 124 can be a conventional unit used for quantum cryptography and, in particular, for implementation of the BB84 protocol. From a functional point of view, the detection module 124 produces a "detection outcome" indicative of a quantum characteristic detected in each received pulse. In the specific non-limiting embodiment being considered here, the quantum characteristic is a detected polarization polarity relative to a selected polarization base (which is identified in the receive base pattern supplied by the controller 122).

To this end, the detection module 124 may comprise a discriminator 402, and two identical detectors 404, 406 referred to as a "zero-detector" 404 and a "one-detector" 406. In addition, the detection module 124 may comprise a first input 124A, which receives photons via the quantum channel 110, and a second input 124B, which receives the receive base pattern from the controller 122 over the data link 118. It is assumed that the detection module 124 will know how to correctly ascertain the boundaries between pulses.

In operation, the discriminator 402 is operable to process the photons in each received pulse as a function of the base for that pulse, which will be identified in the receive base pattern. This results in each photon in the received pulse being diverted towards one or the other of the two detectors 404, 406, thereby causing the detection module 124 to produce a "detection outcome", as is now described for the different scenarios of a vacuum pulse, a single-photon pulse and a multi-photon pulse.

Number of Photons=0 (Vacuum Pulse)

When the received pulse is a vacuum pulse, the discriminator 402 has no photon to divert towards either detector and therefore neither the zero-detector 404 nor the one-detector 406 will record the detection of a photon. This causes the detection module 124 to produce a detection outcome hereinafter referred to as a "zero-click" detection outcome.

Number of Photons=1

When the received pulse comprises exactly one photon, the discriminator 402 will divert the photon towards either the zero-detector 404 or the one-detector 406. This causes the detection module 124 to produce a detection outcome hereinafter referred to as a "one-click" detection outcome, since exactly one of the detectors 404, 406 will "click" (i.e., will record the detection of a photon).

Number of Photons=m>1

When the received pulse comprises m photons imparted with a polarization orientation having a particular base and a particular polarity, the discriminator 402 may divert all m photons towards either the zero-detector 404 or the one-detector 406 (which causes the detection module 124 to produce a "one-click" detection outcome) or it may divert some of the photons towards the zero-detector 404 and others towards the one-detector 406 (hereinafter referred to as a "two-click" detection outcome). This is now explained in greater detail.

Figure 4B:
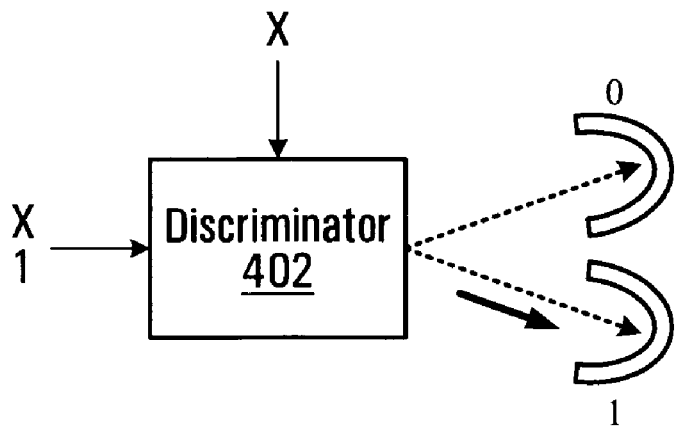
FIGS. 4B-4D show the manner in which incoming photons are processed by the detection module of FIG. 4A.
Figure 4C:
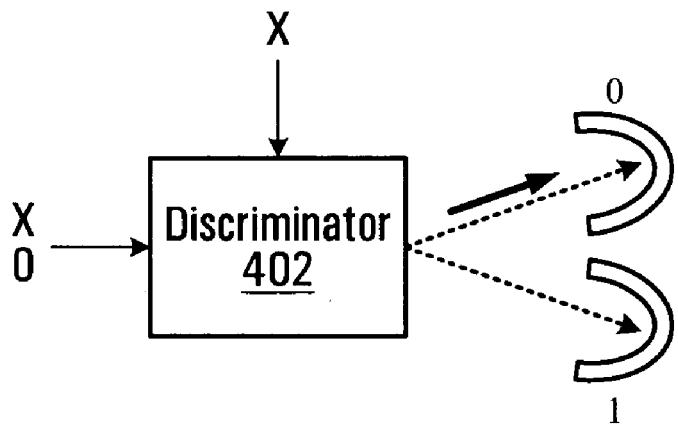

Specifically, if the polarization base used by the discriminator 402 matches the polarization base of the m photons in the received pulse, then all m photons will be diverted to either the zero-detector 404 or the one-detector 406 in a deterministic manner, with dependence upon only the polarization polarity of the photons. This is shown in FIG. 4B for the case where the matching polarization base is the generic "X" (which could be any of the aforementioned polarization bases) and where the polarization polarity of the photons is "1". Similarly, FIG. 4C shows the case where the polarization polarity of the photons is "0".

Figure 4D:
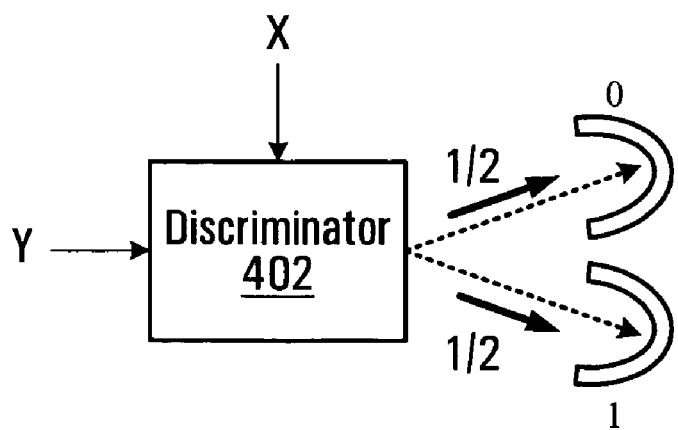

However, if the polarization base used by the discriminator 402 does not match the polarization base of the m photons in the received pulse, then each of the m photons will be randomly diverted to either the zero-detector 404 or the one-detector 406 with roughly equal probability (0.5). This is shown in FIG. 4D, where there is a mismatch between the polarization base of the photons (denoted "Y") and the polarization base used by the discriminator 402 (denoted "X"). In most cases where a polarization base mismatch occurs, both detectors 404,

406 will record the detection of at least one photon, causing the detection module 124 to produce a "two-click" detection outcome. However, in some cases (on average, once out of every $2^{m-1}$ received pulses under conditions of polarization base mismatch), all m photons will actually end up at a single one of the detectors 404, 406, causing the detection module 124 to produce a "one-click" detection outcome.

Therefore, in summary, the detection outcome produced by the detection module 124 for a given received pulse will be either a "zero-click" detection outcome, a "one-click" detection outcome or a "two-click" detection outcome. The detection outcomes for the various received pulses are provided to the controller 122 along a data link 126.

Figure 5:
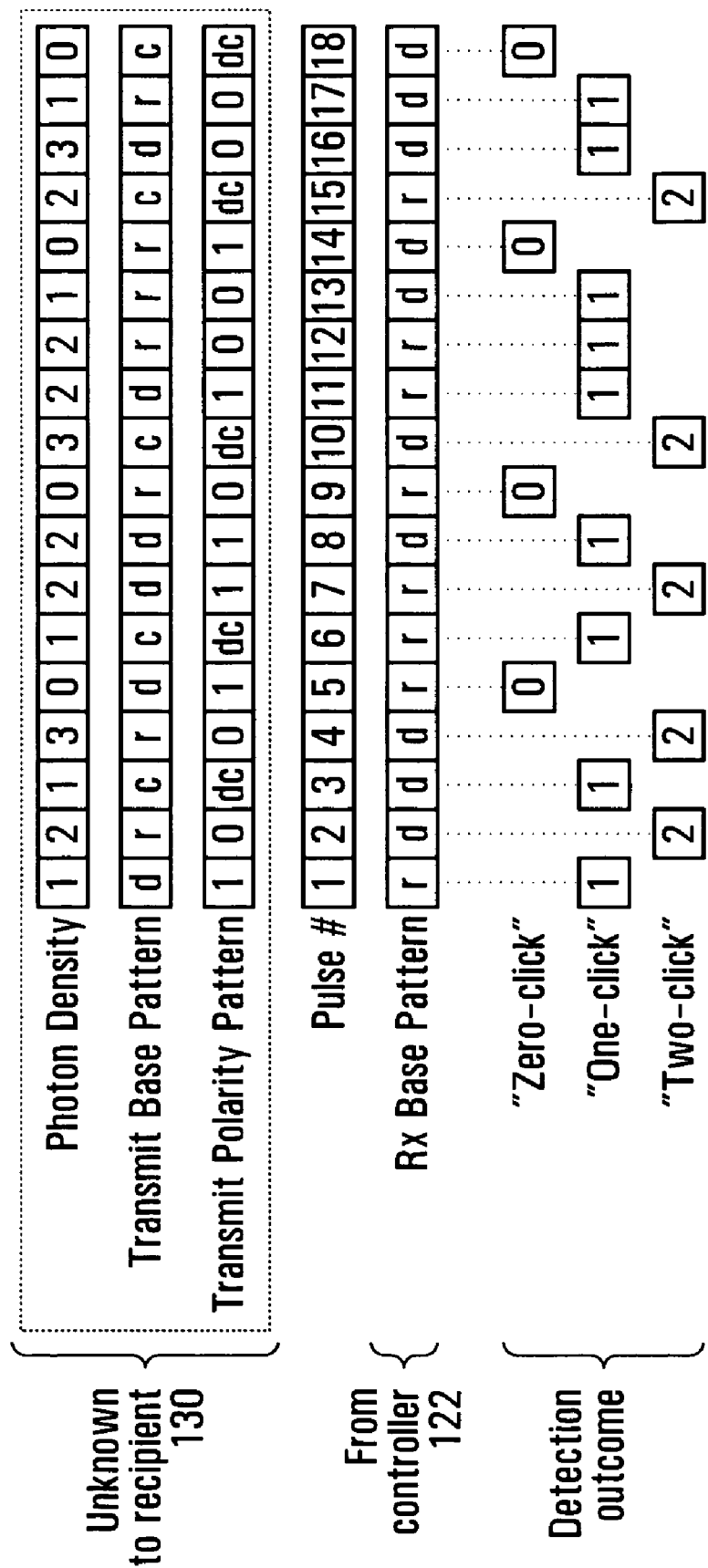
FIG. 5 is an example scenario depicting the derivation of detection outcomes for the aforementioned example pulses.

In the specific non-limiting example embodiment illustrated in FIG. 5, it will be noted that the detection module 124 produces a zero-click detection outcome for received pulses 5, 9, 14 and 18. Also, the detection module 124 produces a one-click detection outcome for the received pulses in positions 1, 3, 6, 8, 11, 12, 13, 16 and 17. Finally, the detection module 124 produces a two-click detection outcome for received pulses in positions 2, 4, 7, 10 and 15.

The astute reader will note that the various reasons why a one-click detection outcome has been produced by the detection module 124 are unknown to the recipient 130. For example, it turns out that the reason why the received pulses in positions 1, 3, 6, 13 and 17 have caused the detection module 124 to produce a one-click detection outcome is because there was exactly one photon in the received pulse. Also, it turns out that the reason why the received pulses in positions 8, 12 and 16 have caused the detection module 124 to produce a one-click detection outcome is because there has been a polarization base match. Finally, the reason why the received pulse in position 11 has caused the detection module 124 to produce a one-click detection outcome is because, as has been artificially decided, this is one of the rare cases where this may occur for a multi-photon pulse despite there having been a polarization base mismatch. This illustrates the various conditions under which a one-click detection outcome may be produced by the detection module 124.

Assessing Integrity of the Quantum Channel 110

It is recalled that the controller 122 receives the relative positions of the supervisory pulses from the transmitter 100. This information may be provided over the classical channel 120 or in any other way. Based on the detection outcomes produced by the detection module 124 and also based on the knowledge of the relative positions of the supervisory pulses, the controller 122 can assess the integrity of the quantum channel 110 and ultimately detect the presence of Eve 140.

I. No Attack by Eve 140

In an initial scenario, it is assumed that Eve 140 is not active and thus it can be assumed that the photons received by the recipient 130 have the same polarization orientation that was imparted to them by the transmitter 100. Based on this assumption, and based on the assumption that photon density for both supervisory pulses and message pulses obeys the Poisson distribution, it is possible to derive certain equations involving certain detection statistics that should hold when Eve 140 is not active.

To begin with, it is recalled that for every received pulse, the detection outcome produced by the detection module 124 will be either be a zero-click detection outcome, a one-click detection outcome or a two-click detection outcome. Moreover, this applies to message pulses and supervisory pulses. Let the following detection statistics be defined on the basis of the detection outcomes:

$P^{(0)}_S$=probability of a supervisory pulse causing a zero-click detection outcome;

$P^{(1)}_S$=probability of a supervisory pulse causing a one-click detection outcome;

$P^{(2)}_S$=probability of a supervisory pulse causing a two-click detection outcome;

$P^{(0)}_M$=probability of a message pulse causing a zero-click detection outcome;

$P^{(1)}_M$=probability of a message pulse causing a one-click detection outcome; and $P^{(2)}_M$=probability of a message pulse causing a two-click detection outcome.

It should be appreciated that the detection statistics can be compiled over a desired number of received pulses, which can be from a few dozen to hundreds or more.

Figure 6:
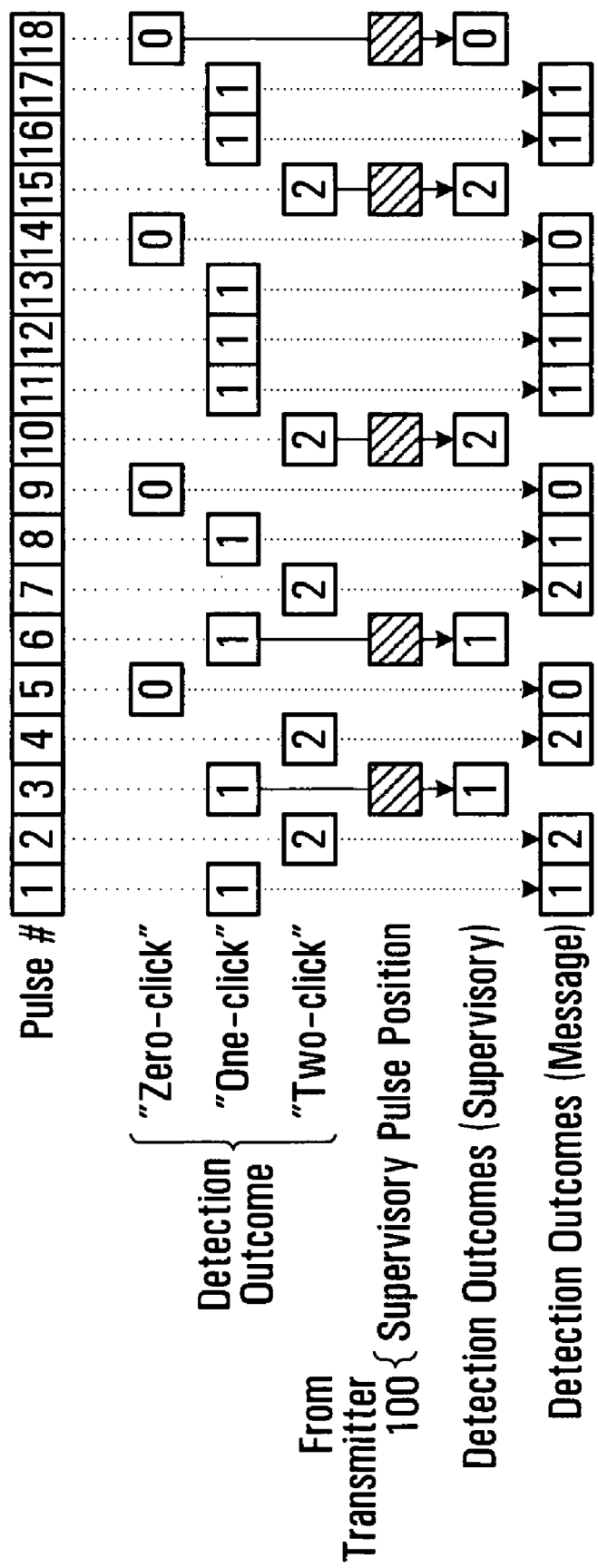
FIG. 6 shows the compilation of detection statistics for both message pulses and supervisory pulses, based on the detection outcomes shown in FIG. 5.

By way of specific non-limiting example, FIG. 6 shows how the detection outcomes from FIG. 5 are broken down into detection outcomes for the supervisory pulses and detection outcomes for the message pulses, when the recipient has knowledge of the relative positions of the supervisory pulses. Specifically, in the second-last row of FIG. 6, there is shown a summary of the detection outcomes for the supervisory pulses and, in the last row, there is shown a summary of the detection outcomes for the message pulses, from which the aforementioned and other detection statistics can be compiled.

Now, since the number of photons in a supervisory pulse obeys the Poisson distribution defined by $p(n, \lambda)=(\lambda^n/n!)e^{-\lambda}$, one has:

$$P^{(0)}_S=p(0, \lambda)=e^{-\lambda}.$$

Also, recalling that the photons in a supervisory pulse will have a polarization base that is different from any of the polarization bases used by the detection module 124, one concludes that there will always be a polarization base mismatch for supervisory pulses. However, there is still a chance that the detection outcome will be a one-click detection outcome. Specifically, this happens whenever the discriminator 402 happens to send all the photons to the same detector (which happens all the time for a pulse carrying a single photon and twice out of $2^n$ times for a pulse carrying $2^n$ photons.) Therefore, one has:

$$P^{(1)}_S=\Sigma_{n=1\ldots\infty}(p(n,\lambda)\cdot(2/2^n)),$$

where $p(n, \lambda)$ is the Poisson distribution and equals $(\lambda^n/n!)e^{-\lambda}$. This gives:

$$P^{(1)}_S=2\cdot(\text{sqrt}(P^{(0)}_S)-P^{(0)}_S).$$

Regarding the two-click detection outcomes, one has the default equation:

$$P^{(2)}_S=1-P^{(0)}_S-P^{(1)}_S.$$

Recalling that $P^{(1)}_S=2\cdot(\text{sqrt}(P^{(0)}_S)-P^{(0)}_S)$, one can show that:

$$P^{(2)}_S=(1-\text{sqrt}(P^{(0)}_S))^2.$$

Next, for the message pulses, which also obey the Poisson distribution $p(n, \lambda)=(\lambda^n/n!)e^{-\lambda}$, one has:

$$P^{(0)}_M=p(0, \lambda)=e^{-\lambda}=P^{(0)}_S.$$

As for the one-click detection outcome probability, one knows that:

$$P^{(1)}_M=1-P^{(0)}_M-P^{(2)}_M$$

where $P^{(2)}_M$ can be shown to be:

$$P^{(2)}_M = \sum_{n=1...\infty} \left( p(n,\lambda) \cdot \left( \frac{1}{2}(1-(2/2^n)) \right) \right)$$

$$= \frac{1}{2}(1 - sqrt(P^{(0)}_M))^2.$$

Noting that the term in parentheses in the above equation is actually $P^{(2)}_S$ one has:

$$P^{(2)}_M = \tfrac{1}{2} P^{(2)}_S.$$

Thus, when Eve 140 is not active, each of the above relationships should hold true. More specifically, one should have:

$P^{(2)}_S = (1 - sqrt(P^{(0)}_S))^2;$      (Equation 1)

$P^{(1)}_M = (2 \cdot sqrt(2 \cdot P^{(2)}_M)) - (3 \cdot P^{(2)}_M);$ and      (Equation 2)

$P^{(2)}_M = \tfrac{1}{2} P^{(2)}_S.$      (Equation 3)

Of course, in practice, a certain deviation from the above relationships is permitted, especially when the number of received pulses is not large. Also, the above relationships have been derived for the case of 100% quantum detection efficiency, i.e., where each photon present in a received pulse will be detected. In actuality, the quantum detection efficiency may not always be at 100%. Accordingly, a calibration phase can be performed in order to establish the expected relationship between the various detection statistics. This may involve certain detection statistics being associated with (e.g., multiplicative or additive) calibration factors. It will be within the purview of one skilled in the art to determine the appropriate calibration factors during a calibration phase.

Moreover, it is within the scope of the present invention to monitor whether only a subset of the above relationships holds true. For example, it is noted that (Equation 3) is particularly simple to evaluate. In other words, when Eve 140 is not active, (Equation 3) dictates that the statistical probability of a two-click detection outcome for a supervisory pulse (i.e., the percentage of supervisory pulses that caused the detection module 124 to produce a two-click detection outcome) should be approximately double the statistical probability of a two-click detection outcome for the message pulses (i.e., the percentage of message pulses that caused the detection module 124 to produce a two-click detection outcome). Thus, it is possible to avoid square root computations.

Of course, it should be appreciated that the aforementioned detection statistics and relationships are merely examples and that various other relationships among detection statistics can be monitored for whether they hold true. This will be particularly applicable when calibration is performed.

It is further noted that monitoring whether the above relationships among the various detection statistics $P^{(2)}_S$, $P^{(0)}_S$, $P^{(1)}_M$ and $P^{(2)}_M$ hold true will permit the recipient 130 to conclude an absence of Eve 140 regardless of the content of the message bits.

Therefore, the integrity of the quantum channel 110 can be monitored without feedback from the transmitter 100 and also without knowledge of the message bits.

II. Intercept-and-Resend Attack

In an intercept-and-resend attack (IRA), Eve 140 intercepts the photons in some of the pulses traveling on the quantum channel 110. To this end, Eve 140 uses a detection module similar to the detection module 124 used in the recipient 130. Also, in order to recover the message bits with maximal probability of success, Eve 140 uses the same message coding bases as the detection module 124 and generates its own receive base pattern (which will be different from the receive base pattern generated by the controller 122).

If the detection outcome for a given intercepted pulse is a two-click detection outcome, Eve 140 will know that the incorrect polarization base was used by the discriminator in its detection module. However, since there are at least two other polarization bases to choose from, Eve 140 is simply incapable of knowing which was the correct polarization base to use. Stated differently, Eve 140 does not know whether the intercepted pulse was a supervisory pulse or a message pulse.

For example, assume that the photons of an intercepted pulse had been imparted with a polarization orientation having a rectilinear polarization base. Assume now that Eve 140 used the diagonal polarization base for detection purposes and that a two-click detection outcome is obtained. Eve 140 may therefore know that the diagonal polarization base is incorrect and may therefore infer that some "other" polarization base should have been used. However, when generating a replacement pulse, Eve 140 will not know which polarization base to use.

In the worst case scenario, Eve 140 can be assumed to know that the possible "other" polarization bases are limited to a total of two (2). In fact, in the worst case scenario, Eve 140 may even know that the two (2) "other" polarization bases are the rectilinear polarization base (which, unbeknownst to Eve 140, is the correct one in this case) and the circular polarization base (which, unbeknownst to Eve 140, is the incorrect one in this case). Thus, on average, in the worst case scenario, Eve 140 will use the correct polarization base with 50% probability and the incorrect polarization base with 50% probability. Stated differently, in the worst case scenario Eve 140 will polarize the photons in a given replacement pulse with the correct polarization base no more than half of the time.

Because of the aforementioned uncertainty, some supervisory pulses which, when processed by the detection module 124, should have cause the latter to produce a two-click detection outcome will now cause it to produce a one-click detection outcome.

This occurs when the base used by the discriminator 402 in the detection module 124 corresponds to polarization base used by Eve 140 to polarize the photons in the replacement pulse. Hence, the incidence of two-click detection outcomes for supervisory pulses will be reduced (i.e., there will be a drop in $P^{(2)}_S$), which has the generalized effect of skewing the detection statistics for the supervisory pulses and for the message pulses. This leads to a greater discrepancy between the right and left hand sides of equations (1) through (3).

III. Photon Beam Split Attack

In a beam split attack (BSA), Eve 140 steals some of the photons from some of the pulses traveling on the quantum channel 110. This has the effect of reducing the photon density (i.e., the number of photons per pulse). This, in turn, invalidates some of the assumptions made when deriving the aforementioned equations (1) through (3). Specifically, the photon density of the pulses received at the recipient 130 will no longer be governed by the Poisson distribution. The lesser number of photons per received pulse will tend to cause an increase in zero-click detection outcomes and one-click detection outcomes (i.e., there will be an increase in $P^{(0)}_S$ and $P_{(1),S}$), which has the generalized effect of skewing the detection statistics for the supervisory pulses and for the message pulses. This leads to a greater discrepancy between the right and left hand sides of equations (1) through (3).

In summary, it will be apparent that by compiling detection statistics for the supervisory pulses and the message pulses and monitoring whether equations (1) through (3) above hold true, the recipient 130 can determine the presence of Eve 140. In fact, it may even be possible to determine the type of attack that Eve 140 is attempting to make. For example, the recipient 130 can suspect that an IRA is taking place if the detected value of $P^{(2)}_S$ suddenly drops (e.g., falls by more than a threshold amount or percentage), or can suspect that a BSA is taking place if the measured value of $P^{(0)}_S$ or $P^{(1)}_S$ suddenly rises (e.g., increases by more than a threshold amount or percentage). When a suspected attack is detected, the controller 122 can signal this to an appropriate entity for further action, such as termination of the communication or continuing with the communication over an alternate channel. Of course, other types of attacks will also manifest themselves as an increase in the discrepancy between the right and left hand sides of equations (1) through (3).

Moreover, it will be appreciated that the presence of Eve 140 can be detected by the recipient 130 without requiring any information from the transmitter 100 other than the relative positions of the supervisory pulses. Since this information can be provided after the transmission has taken place, one can eliminate the danger that Eve 140 would somehow be able to preemptively craft an attack to avoid detection.

Also, the fact that knowledge of the message bits is not required in order to monitor the integrity of the quantum channel 110 is advantageous from the point of view that it permits the task of monitoring the integrity of the quantum channel 110 to be sub-contracted to a third party without having to disclose the message bits to such third party.

It is also noted from the above that there has been no limit placed on λ (the average number of photons per pulse). For example, by setting λ to 9, the probability of finding a vacuum pulse is $e^{-9}$, which is about 0.01%. In other words, every ten thousandth pulse, on average, may be a vacuum pulse. This is to be contrasted with the conventional goal of making multi-photon pulses an extremely rare occasion by causing 90% or more of the pulses to be vacuum pulses (i.e., $\lambda=10^{-1}$ to $10^{-2}$ or less). It will thus be appreciated the present invention allows tens to hundreds of times more pulses to be carriers of photons and hence conveyors of message bits.

Recovery of Message Bits

It will be apparent that a zero-click detection outcome is useless for data recovery. Moreover, a two-click detection outcome is just as useless because the polarization polarity cannot be recovered. Thus, the ability to recover the message bits rests with the detected polarization polarities for the message pulses that caused the detection module 124 to produce a one-click detection outcome.

To enable the message bits to be recovered, and with reference again to FIG. 4, for each received pulse that caused the detection module 124 to produce a one-click detection outcome, the detection module 124 is further adapted to record which of the detectors 404, 406 was the one that "clicked". This indicates the detected polarization polarity for the corresponding message pulse.

The detected polarization polarity for each received pulse that causes the detection module 124 to produce a one-click detection outcome is provided to the controller 122 along the data link 126. At the controller 122, only the message pulses are considered. (It will be recalled that the controller 122 learns the relative positions of the message pulses based on information received from the transmitter 100, possibly via the classical channel 120.)

Now, for a given message pulse, it should be recognized that the polarization base used by the discriminator 402 may or may not match the polarization base of the photons contained in that given message pulse. When there is a polarization base match, the detected polarity will be correct, which means that the correct message bit is recovered. This event occurs at a rate that depends on the relative number of supervisory and message pulses.

On the other hand, when there is a polarization base mismatch, the detected polarity will be incorrect half the time and correct the other half of the time, on average. Thus, it will be appreciated that for more than half of the occurrences of a one-click detection outcome, the correct polarity will have been detected, which means that the correct message bit will be recovered.

As can be appreciated, the controller 122 does not know which of the recovered message bits are correct and which are not. Nevertheless, through the use of error correction, it becomes feasible to recover some or all of the message bits from the recovered message bits without actually knowing which message bits have been correctly recovered. Examples of error correction include Alamouti coding, Binary Golay code, Check bit, Check digit, Convolutional code, Digital fountain code, Erasure code, Forward error correction, Hagelbarger code, Hamming code, Low-density parity-check code, Parity bit, Reed-Solomon error correction, Reed-Muller code, Sparse graph code, Turbo code, etc. Still other techniques will be apparent to those of skill in the art.

Figure 7:
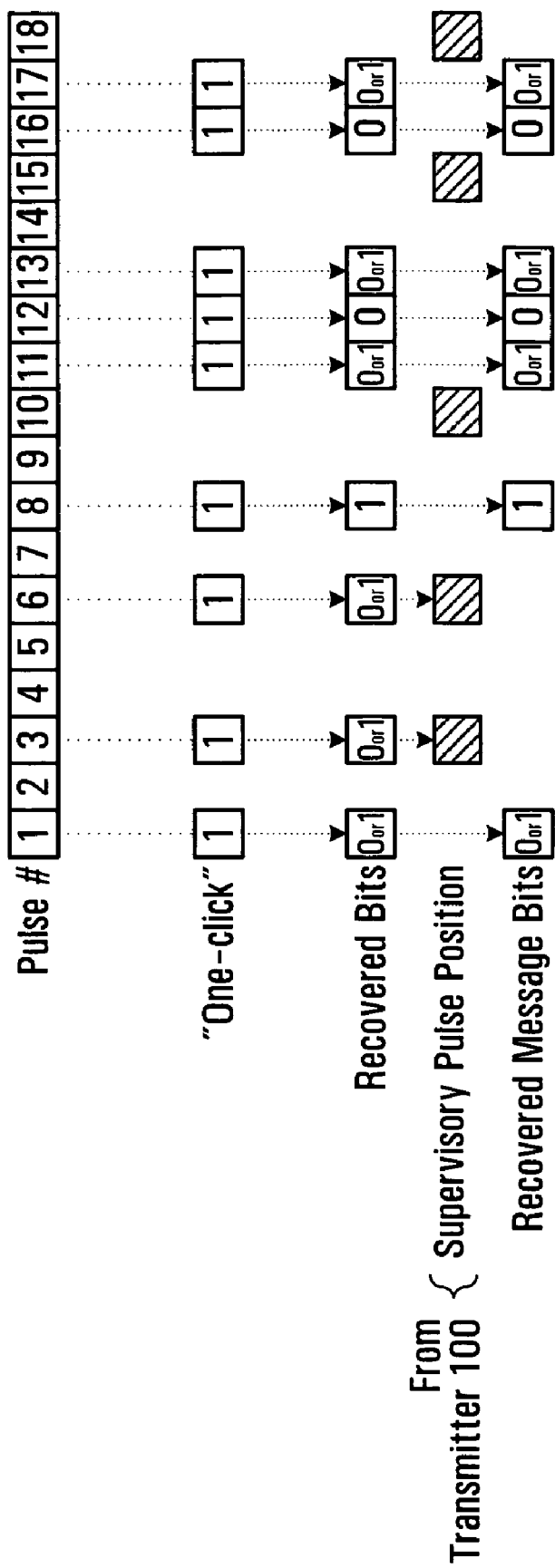
FIG. 7 shows the recovery of message bits based on the detection outcomes shown in FIG. 5.

In the non-limiting example embodiment of FIG. 7, the message pulses that caused the detection module 124 to produce a one-click detection outcome are in positions 1, 8. 11-13, 16 and 17. Now, unbeknownst to the recipient 130, the detected polarization polarity for the pulses in positions 8, 12 and 16 will be the correct one, while the detected polarization polarity for each of the pulses in positions 1, 11, 13 and 17 may be either the correct one or the incorrect one. Since the controller 122 does not know which detected polarization polarities are correct and which are not, but know that at least some are correct, error correction can be used to recover the message bits.

In an alternative embodiment, the transmitter 100 can indicate to the recipient 130 the transmit base pattern, which allows the recipient 130 to determine for itself which of the message bits have been correctly recovered by realizing when a polarization base match as occurred. Alternatively, the recipient can provide the transmitter 100 with the receive base pattern, with the transmitter 100 confirming to the recipient 130 which polarization bases in the receive base pattern were correct, which again allows the recipient 130 to determine which of the message bits have been correctly recovered. This can increase the percentage of message bits that can be correctly recovered.

Thus, a new process for monitoring the integrity of the quantum channel 110 has been described and illustrated. In particular, the quantum channel consists of quantum pulses. The quantum pulses are classified into supervisory pulses and message pulses. The transmitter 100 decides randomly which quantum pulses are of which type and, moreover, the transmitter 100 assigns each message pulse to a message bit. The transmitter 100 then encodes the quantum pulses using a coding base. Specifically, the message pulses are encoded using a coding base randomly selected from a set of coding bases (and with a polarity relative to the coding base that depends on the value of the corresponding message bit), whereas the supervisory pulses are encoded using a supervisory coding base different from the coding bases in the aforementioned set. The encoded pulses are sent to the recipient 130 along the quantum channel 110. In addition, the transmitter 100 informs the recipient 130 of the positions of the supervisory pulses.

The recipient 130 detects the pulses relative to a locally selected coding base. The outcome is either a zero-click detection outcome, a one-click detection outcome or a two-click detection outcome. By measuring the received proportion of zero-click detection outcomes, one-click detection outcomes and two-click detection outcomes, for both message pulses and supervisory pulses, and by verifying whether these detection statistics obey certain expected relationships, the recipient 130 can determine whether an attack is taking place on the quantum channel 110. Therefore, the invention disclosed herein can be used for monitoring the integrity of the quantum channel, even when multi-photon pulses are being employed to convey information.

When the recipient 130 detects that there has been an attack on the quantum channel 110, the controller 122 can take action, such as by releasing an alarm signal indicative of there having been a loss of integrity of the quantum channel 110. Moreover, this alarm signal may indicate the apparent nature of the attack, as discussed above.

In addition to the above, those skilled in the art may find that the present invention applies to monitoring the integrity of a quantum channel supporting multi-quanta pulse transmission where the quanta are different from photons.

The functionality of either or both of the controllers 106, 122 may be implemented as pre-programmed hardware or firmware elements (e.g., application specific integrated circuits (ASICs), electrically erasable programmable read-only memories (EEPROMs), etc.), or other related components. In other embodiments, either or both of the controllers 106, 122 may be implemented as an arithmetic and logic unit (ALU) having access to a code memory (not shown) which stores program instructions for the operation of the ALU. The program instructions could be stored on a medium which is fixed, tangible and readable directly by either or both of the controllers 106, 122, (e.g., removable diskette, CD-ROM, ROM, fixed disk, USB drive), or the program instructions could be stored remotely but transmittable to either or both of the controllers 106, 122 via a modem or other interface device.

While specific embodiments of the present invention have been described and illustrated, it will be apparent to those skilled in the art that numerous modifications and variations can be made without departing from the scope of the invention as defined in the appended claims.

What is claimed is:

1. An apparatus for transmitting a plurality of message data elements to a recipient over a quantum channel, comprising:
   a) a source adapted for emitting pulses of quanta, the number of quanta per pulse being variable over time;
   b) a controller adapted for
      (1) designating certain ones of the pulses as supervisory pulses and other ones of the pulses as message pulses;
      (2) associating each of the message data elements with a respective one of the message pulses; and
      (3) informing the recipient as to which pulses are message pulses and which pulses are supervisory pulses;
   c) a quantum characteristic imparting module adapted for:
      (1) for each pulse containing one or more quanta, imparting to the one or more quanta a quantum characteristic defined by:
         (I) when said pulse is a message pulse:
            a polarization base dynamically selected from a set of two or more predetermined message coding bases; and
            a polarity relative to the selected polarization base, the polarity being selected in accordance with a data value of the message data element associated with said pulse;
         (II) when said pulse is a supervisory pulse:
            a polarization base selected from a set of at least one predetermined supervisory coding bases, each of the supervisory coding bases being distinct from each of the set of message coding bases;
      (2) releasing the quanta into the quantum channel.

2. The apparatus defined in claim 1, wherein the source is a Poisson source.

3. The apparatus defined in claim 2, wherein the Poisson source is characterized by an average number of quanta per pulse greater than one.

4. The apparatus defined in claim 2, wherein the quanta are photons.

5. The apparatus defined in claim 4, wherein the quantum characteristic is a polarization orientation relative to a polarization base.

6. A method for transmitting a plurality of message data elements over a quantum channel, comprising:
   a) emitting pulses of quanta, the number of quanta per pulse being variable over time;
   b) designating certain ones of the pulses as supervisory pulses and other ones of the pulses as message pulses;
   c) associating each of the message data elements with a respective one of the message pulses;
   d) for each pulse containing one or more quanta, imparting to the one or more quanta a quantum characteristic defined by:
      (I) when said pulse is a message pulse:
         a polarization base dynamically selected from a set of two or more predetermined message coding bases;
         a polarity relative to the selected polarization base, the polarity being selected in accordance with a data value of the message data element associated with said pulse;
      (II) when said pulse is a supervisory pulse:
         a polarization base selected from a set of at least one predetermined supervisory coding bases, each of the supervisory coding bases being distinct from each of the set of message coding bases;
   e) releasing the quanta into the quantum channel;
   f) informing a recipient as to which pulses are message pulses and which pulses are supervisory pulses.

7. The method defined in claim 6, wherein the quanta are photons.

8. The method defined in claim 7, wherein the quantum characteristic is a polarization orientation relative to a polarization base.

9. An apparatus for transmitting a plurality of message data elements over a quantum channel, comprising:
   a) means for emitting pulses of quanta, the number of quanta per pulse being variable over time;
   b) means for designating certain ones of the pulses as supervisory pulses and other ones of the pulses as message pulses;
   c) means for associating each of the message data elements with a respective one of the message pulses;
   d) means for imparting to the quanta in each pulse a quantum characteristic defined by:
      (I) when said pulse is a message pulse:
         a polarization base dynamically selected from a set of two or more predetermined message coding bases; and a polarity relative to the selected polarization base, the polarity being selected in accordance with a data value of the message data element associated with said pulse;

(II) when said pulse is a supervisory pulse:

a polarization base selected from a set of at least one predetermined supervisory coding bases, each of the supervisory coding bases being distinct from each of the set of message coding bases;

e) means for releasing the quanta into the quantum channel;

f) means for informing a recipient as to which pulses are message pulses and which pulses are supervisory pulses.

* * * * *